(12) United States Patent
Richards et al.

(10) Patent No.: US 11,615,539 B2
(45) Date of Patent: Mar. 28, 2023

(54) APPARATUS, METHOD AND COMPUTER PROGRAM PRODUCT FOR PREDICTING WHETHER AN OBJECT MOVING ACROSS A SURFACE WILL REACH A TARGET DESTINATION

(71) Applicants: Sony Group Corporation, Tokyo (JP); Sony Europe B.V., Weybridge (GB)

(72) Inventors: Mathew Richards, Basingstoke (GB); Luke Dodd, Basingstoke (GB)

(73) Assignees: Sony Group Corporation, Tokyo (JP); Sony Europe B.V., Weybridge (GB)

( * ) Notice: Subject to any disclaimer, the term of this patent is extended or adjusted under 35 U.S.C. 154(b) by 0 days.

(21) Appl. No.: 17/204,991

(22) Filed: Mar. 18, 2021

(65) Prior Publication Data

US 2021/0390711 A1  Dec. 16, 2021

(30) Foreign Application Priority Data

Jun. 16, 2020  (GB) ...................... 2009112

(51) Int. Cl.
*G06T 7/246* (2017.01)

(52) U.S. Cl.
CPC .... *G06T 7/248* (2017.01); *G06T 2207/20081* (2013.01); *G06T 2207/30224* (2013.01); *G06T 2207/30241* (2013.01)

(58) Field of Classification Search
CPC . G06T 2207/30224; G06T 2207/20081; G06T 2207/10016; G06T 7/248; G06T 2207/30241; G06T 7/251
See application file for complete search history.

(56) References Cited

U.S. PATENT DOCUMENTS

| | | | |
|---|---|---|---|
| 2008/0166015 A1* | 7/2008 | Haering | H04N 7/181 382/103 |
| 2016/0212385 A1* | 7/2016 | Ginsberg | G06T 7/73 |
| 2019/0266735 A1* | 8/2019 | Hall | G06T 7/20 |
| 2020/0074266 A1* | 3/2020 | Peake | G06V 10/774 |
| 2020/0167936 A1* | 5/2020 | Marty | G06T 7/246 |

FOREIGN PATENT DOCUMENTS

| | | | | |
|---|---|---|---|---|
| CA | 3029124 A1 * | 1/2018 | | G01C 21/28 |
| WO | WO 2018/085894 A1 | 5/2018 | | |
| WO | WO 2019/094844 A1 | 5/2019 | | |

* cited by examiner

*Primary Examiner* — Pinalben Patel
(74) *Attorney, Agent, or Firm* — Oblon, McClelland, Maier & Neustadt, L.L.P.

(57) ABSTRACT

An apparatus for predicting whether an object moving across a surface will reach a target destination is provided, the apparatus comprising circuitry configured to: receive a first image and one or more subsequent second images from a camera; identify a location of an object on a surface in the first image; identify a location of the object on the surface in one or more of the second images; determine one or more motion characteristics of the object based on the location of the object in the first image and the location of the object in the one or more second images; generate a predicted path of the object across the surface based on a model of the surface and the motion characteristics of the object; and generate a prediction of whether the object will reach the target destination based on the predicted path of the object and the location of the target destination.

20 Claims, 7 Drawing Sheets

APPARATUS, METHOD AND COMPUTER PROGRAM PRODUCT FOR PREDICTING WHETHER AN OBJECT MOVING ACROSS A SURFACE WILL REACH A TARGET DESTINATION

BACKGROUND

Field of Disclosure

The present disclosure relates to an apparatus, method and computer program product for predicting whether an object moving across a surface will reach a target destination.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

In recent years, there has been an increase in the levels of video coverage of events (such as sporting events or the like). That is, the number of broadcasters or providers of video content has significantly increased, as so has the demand for video coverage of these events. Furthermore, content digesters (such as viewers and consumers) now demand high levels of video services from the broadcasters and providers in relation to the event (or events) being covered.

In particular, a portion of these video services may include augmented content, visuals or displays which provide additional information related to the event to the content digester; the additional information is often provided alongside the video content itself and thus enhances the viewing experience. Furthermore, provision of the additional information enables a greater understanding of the event to be obtained by the content digester, thus increasing the sense of immersion in the event.

However, it can be difficult to provide certain services and augmented content for certain events. In fact, there is often particular difficulty in respect of live transmission events, as the outcome of an action or event can be uncertain thus leading to difficulty in providing the desired services or augmented content at the time the video content is transmitted (i.e. broadcast or provided).

Of these live transmission events, sporting events often present the greatest challenge to the content providers (such as the broadcasters or other providers of video content) as these events are complex and can change rapidly. Here, the demand for additional services, including augmented content, often exceeds that which can be provided.

It is an aim of the present disclosure to address these issues.

SUMMARY

A brief summary about the present disclosure is provided hereinafter to provide basic understanding related to certain aspects of the present disclosure.

In a first aspect of the disclosure, an apparatus for predicting whether an object moving across a surface will reach a target destination is provided, the apparatus comprising circuitry configured to: receive a first image and one or more subsequent second images from a camera; identify a location of an object on a surface in the first image; identify a location of the object on the surface in one or more of the second images; determine one or more motion characteristics of the object based on the location of the object in the first image and the location of the object in the one or more second images; generate a predicted path of the object across the surface based on a model of the surface and the motion characteristics of the object; and generate a prediction of whether the object will reach the target destination based on the predicted path of the object and the location of the target destination.

In a second aspect of the disclosure, a method of predicting whether an object moving across a surface will reach a target destination is provided, the method comprising: receiving a first image and one or more subsequent second images from a camera; identifying a location of an object on a surface in the first image; identifying a location of the object on the surface in one or more of the second images; determining one or more motion characteristics of the object based on the location of the object in the first image and the location of the object in the one or more second images; generating a predicted path of the object across the surface based on a model of the surface and the motion characteristics of the object; and generating a prediction of whether the object will reach the target destination based on the predicted path of the object and the location of the target destination.

In a third aspect of the disclosure, a computer program product is provided, the computer program product comprising instructions which, when the program is executed by a computer, cause the computer to carry out a method of predicting whether an object moving across a surface will reach a target destination, the method comprising: receiving a first image and one or more subsequent second images from a camera; identifying a location of an object on a surface in the first image; identifying a location of the object on the surface in one or more of the second images; determining one or more motion characteristics of the object based on the location of the object in the first image and the location of the object in the one or more second images; generating a predicted path of the object across the surface based on a model of the surface and the motion characteristics of the object; and generating a prediction of whether the object will reach the target destination based on the predicted path of the object and the location of the target destination.

According to embodiments of the disclosure, a prediction can be made as to whether an object moving across a surface will reach a target destination. As such, accurate and efficient predictions can be made regarding the outcome of an event (such as a sporting event). This enables additional services to be provided in substantially real time during an event, enhancing the content digesters experience of the event.

It will be appreciated that the present disclosure is not particularly limited to these above identified advantageous technical effects. Rather, further advantages and effects will become apparent to the skilled person when reading the disclosure.

Moreover, the foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
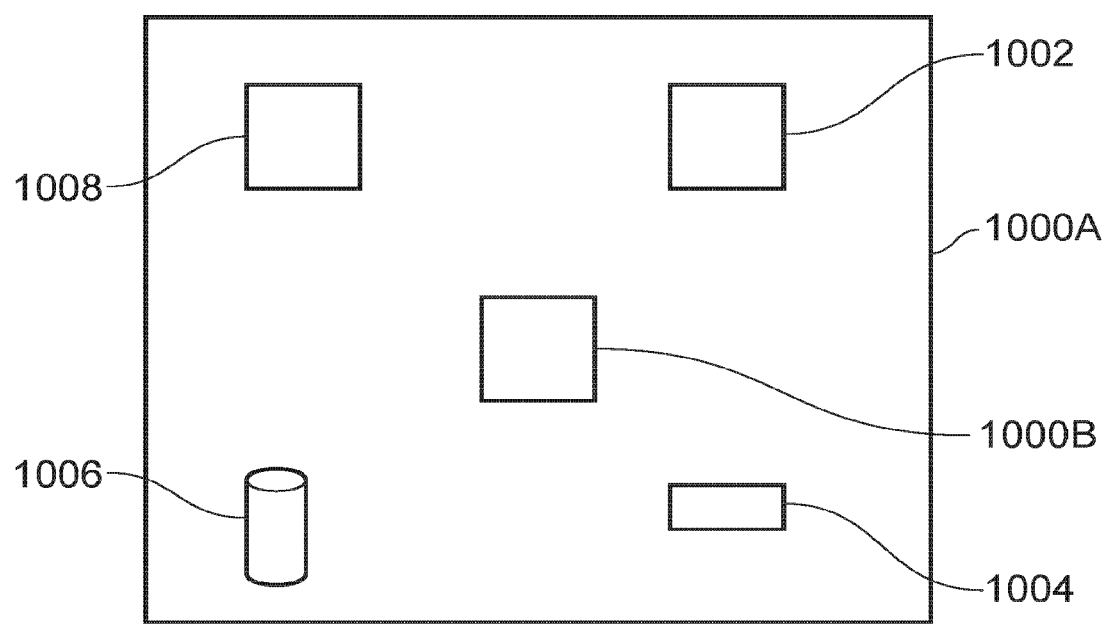
FIG. 1 illustrates a device according to embodiments of the disclosure.

Referring now to the drawings, wherein like reference numerals designate identical or corresponding parts throughout the several views.

Referring to FIG. 1 of the present disclosure, an apparatus or device 1000A according to embodiments of the disclosure is shown. Typically, an apparatus 1000A according to embodiments of the disclosure is a computer device such as a personal computer or a terminal connected to a server. Indeed, in embodiments, the apparatus may also be a server. The apparatus 1000A is controlled using a microprocessor or other processing circuitry 1000B. In some examples, the apparatus 1000B may be a portable computing device such as a mobile phone, laptop computer or tablet computing device.

The processing circuitry 1000B may be a microprocessor carrying out computer instructions or may be an Application Specific Integrated Circuit. The computer instructions are stored on storage medium 1006 which maybe a magnetically readable medium, optically readable medium or solid state type circuitry. The storage medium 1006 may be integrated into the apparatus 1000A or may be separate to the apparatus 1000A and connected thereto using either a wired or wireless connection. The computer instructions may be embodied as computer software that contains computer readable code which, when loaded onto the processor circuitry 1000B, configures the processor circuitry 1000B to perform a method according to embodiments of the disclosure.

Additionally, an optional user input device 1002 is shown connected to the processing circuitry 1000B. The user input device 1002 may be a touch screen or may be a mouse or stylist type input device. The user input device 1002 may also be a keyboard or any combination of these devices.

A network connection 1006 may optionally be coupled to the processor circuitry 1000B. The network connection 1006 may be a connection to a Local Area Network or a Wide Area Network such as the Internet, a Virtual Private Network or the like. The network connection 1006 may be connected to a server allowing the processor circuitry 1000B to communicate with another apparatus in order to obtain or provide relevant data. The network connection 1006 may be behind a firewall or some other form of network security.

Additionally, shown coupled to the processing circuitry 1000B, is a display device 1008. The display device 1008, although shown integrated into the apparatus 1000A, may additionally be separate to the apparatus 1000A and may be a monitor or some kind of device allowing the user to visualize the operation of the system. In addition, the display device 1008 may be a printer, projector or some other device allowing relevant information generated by the apparatus 1000A to be viewed by the user or by a third party.

Figure 2:
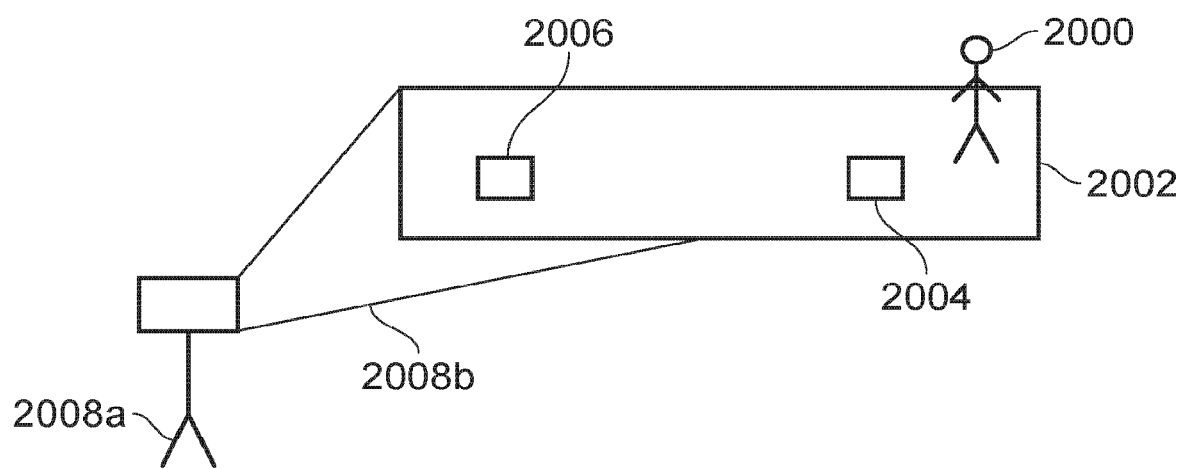
FIG. 2 illustrates an example situation to which embodiments of the disclosure can be applied.

FIG. 2 illustrates an example situation to which embodiments of the present disclosure may be applied. In this example, a person 2000 is stood on a surface 2002. The surface 2002 is, in this example, a playing surface such as a golf green (i.e. putting green or putting surface) or the like. That is, in this example, the person 2000 is playing a sport such as golf. Furthermore, in this example situation, a golf ball 2004 is also located on the surface 2002. The person 2000 hits the golf ball 2004 with a club in an attempt to cause the golf ball to move or roll across the surface 2002 such that it reaches a certain target destination. In this example, the target destination is a golf hole 2006.

An image capture device, such as a camera 2008a, is also provided which captures images of the golf green. That is, camera 2008a has a field of view 2008b which encompasses the surface 2002, the player 2000, the golf ball 2004 and the golf hole 2006. In some examples, the field of view 2008b of the camera 2008a may cover only a portion of these (such as only a portion of the surface 2002). Images received from camera 2008a may be provided to a television broadcaster who broadcasts the images which may then be viewed by other people with compatible devices. That is, there may be a number of viewers who are watching the player 2000 play the sport on their personal televisions and/or computing devices at home, for example.

In some examples, the camera 2008 may have a fixed position/location (e.g. a fixed position or location on the golf course). As such, camera 2008 may remain in this fixed position as it captures images of the surface 2002. Additionally, the camera 2008 may be able to rotate on its mount/stand in order to change the field of view, even when the camera stand itself remains in a fixed location. More generally therefore, it will be appreciated that rotational movement of the camera may be possible even if translational movement of the camera is restricted.

In some examples, a broadcaster may augment the images which are received from camera 2008a with certain additional statistical or visual information. That is, certain additional information may be overlaid on the images with are received from camera 2008a in order to further enhance the viewers experience of the content. In particular, in this example, the broadcaster may augment the images which are received from camera 2008a with information regarding the particular person 2000 (such as individual player statistics), information regarding the golf green (such as which hole of the golf course the golf green is part of), or information regarding the current activity (such as how long the player 2000 has taken for the current shot). This additional information may enhance a viewer's understanding and sense of immersion when watching the sport.

When the player 2000 hits the golf ball, the golf ball 2004 will begin to move across the golf green 2002. However, at that stage, it can be difficult for a viewer to understand whether or not the shot is on target (i.e. whether or not it will reach the hole in due course in this example). That is, it can be difficult for a viewer to understand from the images being broadcast whether or not the object is moving towards the target destination (here, in this example, the golf hole).

Moreover, as the object is moving across a surface, complexities of the interaction of the object with the surface (such as a slope of the golf green in this example) may mislead the viewer and cause the appearance that the object will reach the target destination even if, later in time, it becomes apparent that it did not. This may generate a sense of frustration for the viewer. In other words, only once the ball has stopped moving will the viewer understand whether or not the shot was on target (i.e. whether the golf ball reached or fell into the golf hole).

The broadcaster may augment the images received from the camera with information as to whether the shot was successful only after the shot has been completed in its entirety (i.e. when the golf ball stops moving). Therefore, in a live stream of the event (that is, where the images received from the camera are being provided by the broadcaster to the viewers in real time) the broadcaster is unable to provide any additional information to enhance the viewer's experience in this regard.

Of course, there are many other reasons for desiring a prediction as to whether an object moving across a surface (such as the golf ball across the golf green) will reach a target destination. In sporting events, for example, people often place a monetary bet on the outcome of the sporting event. Often these bets are placed as the sporting event itself is unfolding (i.e. an "in game" bet) and not only before the sporting event begins. It is therefore important to understand whether or not an object moving across a surface will reach a target destination (such as whether the golf ball will reach the golf hole) once the object has been struck (i.e. had initial momentum imparted to it) in order that appropriate "in game" bets may be offered and placed. Furthermore, in some situations, it may be desired to determine how near or close to the target the object moving across the surface will get. This may be particularly advantageous to help a user to understand how good/bad the outcome of the shot is likely to be once it has been made. Therefore, a consideration of whether the object will reach the target destination may include a consideration of how close to the target the object will get.

As such, for these reasons (and also for those reasons described in the background of the present disclosure), a technical solution for predicting whether an object moving across a surface will reach a target destination is desired.

Accordingly, a device for predicting whether an object moving across a surface will reach a target destination is provided in accordance with embodiments of the disclosure.

The device, which may be implemented as a device such as device 1000A described with reference to FIG. 1 of the present disclosure, comprises circuitry, such as processing circuitry 1000B, configured to receive a first image and one or more subsequent second images from a camera. Then, the circuitry is configured to identify a location of an object on a surface in the first image and identify a location of the object on the surface in one or more of the second images.

On the basis of these locations, the circuitry is then configured to determine one or more motion characteristics of the object. The circuitry is then further configured to generate a predicted path of the object across the surface based on a model of the surface and the motion characteristics of the object.

Finally, the circuitry is configured to generate a prediction of whether the object will reach the target destination based on the predicted path of the object and the location of the target destination.

In this manner, the device according to embodiments of the disclosure is able to provide accurate and efficient predictions regarding the outcome of an event (such as a sporting event). This enables additional services to be provided in substantially real time during an event, enhancing the experience of content digesters.

Embodiments of the disclosure will now be explained in more detail with reference to FIGS. 2 to 5 of the present disclosure.

<Receiving Images>

Consider again the example situation of FIG. 2 of the present disclosure. In this example, as previously described, a player 2000 is attempting to make a putt on a golf green during a game of golf That is, the player is attempting to hit the golf ball 2004 with a golf club such that the golf ball 2004 moves or rolls across the surface and reaches the golf hole 2006. Image capture device 2008a captures images of this portion of the golfing event.

The image capture device 2008a itself is not particularly limited in accordance with embodiments of the disclosure. For example, image capture device 2008a may a camera capable of capturing a series of still or moving images (i.e. video) of the golf green. The image capture device may be capable of capturing images of any resolution including high definition or 4K images. In some examples, a series of image capture devices may be provided. However, advantageously, owing to the use of the model of the surface in conjunction with the motion characteristics of the object, an accurate and efficient prediction as to whether the object will reach the target may be provided through the use of only a single image capture device.

Now, according to embodiments of the disclosure, the images captured by image capture device 2008a are provided to the device 1000A (not shown in FIG. 2 of the present disclosure), being the device for predicting whether or not the object moving across a surface will reach the target destination. That is, circuitry of device 1000A is configured to receive, from the image capture device, a first image and one or more subsequent second images of the object on the surface.

These images may be received as part of a live stream of images captured by the image camera 2008a, for example.

In some examples, the images may be received from the image capture device by means of a wired connection. However, the images could also be received from the image capture device by a wireless connection. Indeed, the images may be received over a local network connection. These images may also be first placed in a storage device external to the device 1000A and then extracted from the external storage device by device 1000A as required. However, it is advantageous that the device 1000A receives the images from the image capture device in substantially real time.

In some examples, the images may only be captured and/or provided to the device 1000A when the player hits the ball (i.e. as the ball starts to move across the surface). However, in other examples, the images may be continuously provided to the device 1000A both before and after the object has been struck by the player.

Now, as the first image and the one or more second images are captured sequentially by the image capture device, it will be appreciated that the first and second images capture a temporal evolution of the sporting event.

Consider, for example, that the first image received from the image capture device 2008a by device 1000A is received as the person 2000 hits the golf ball with the golf club. In this first image, the golf ball will be at its initial location. Then, in a second image received from the image capture device captured a time T after the first image, the ball, having been hit by the golf club of the player, will have moved a distance D across the surface of the golf green. Therefore, movement of the golf ball across the green will be apparent from a comparison of the two images.

Of course, if the golf ball has not been hit by the person 2000 there will be no movement of the golf ball between the two images. There will also be no movement of the golf ball between the images if the golf ball stops moving (i.e. after is has moved a short distance after being hit by the player 2000). In either of these situations, a prediction as to whether the object will reach the target destination or not will not be provided by the device (as it is apparent that an object which does not move cannot reach the target destination).

Accordingly, when at least two images of the object have been received by device 1000A (with a variation of location of the object between the two images) a prediction of the motion of the ball across the surface will be generated by device 1000A, as is described in more detail below.

<Identification of Location>

Once the images have been received, the circuitry of device 1000A is further configured to identify a location of an object on a surface in the first image and identify a location of the object on the surface in one or more of the second images. That is, while the images received from image capture device 2008a contain the object (such as the golf ball), the location of the object within those images is not known to device 1000A at the time that the images are received. As such, before a prediction of the movement of the object across the surface can be produced by device 1000A, the location of the object within each of those images must be obtained.

It will be appreciated that the present disclosure is not particularly limited to a particular mechanism for identifying the location of the object in the image data which has been received. That is, there are a number of different example techniques which may be used in order to locate the object within the image data. Any of these example techniques may be used in order to identify the location of the object, as long as the location information derived from these techniques enables a direct comparison of the location of the ball in respective images.

In some examples, object recognition software may be used in order to locate the object in the images received from the image capture device. Such object recognition software enables the identification of the location of a known object in an image. This may include template based object recognition, where a small target image of an object is used in order to find corresponding objects in a larger image.

Consider the example situation of FIG. 2 of the present disclosure. Here, the target object which must be identified in the images received from the image capture device is the golf ball 2004. Accordingly, a small target image of a golf ball may be provided to the device 1000A. Then, using template based object recognition techniques, the device 1000A may be configured to identify regions of each of the images which correspond to the target image. These regions are then considered to correspond to the location of the golf ball in the images received from the image capture device 1008A.

In some examples, a set of target images may be provided to the device 1000A. The set of target images may include a number of different images of the golf ball. Then, each of these target images may be used in order to locate the golf ball in each of the images received from the image capture device. Use of the set of target images in this manner may further improve the accuracy of identification of the object in the images, as variations in the appearance of the object are more readily accounted for.

Alternatively, in other examples, image segmentation analysis may be performed in order to identify the location of the object in the images received from the image capture device. Here, certain properties of the target object (such as the size or colour of the target object) are used in order to locate the target object in the images which have been received from the image capture device. Considering again the example of FIG. 2 of the present disclosure, it may be known that a golf ball is a predominantly white spherical object of approximately half a centimeter in size. This information may then be used by device 1000A in order to search the images received from the image capture device 1000A for the golf ball. Any region of an image conforming to this definition would then be identified as the location of the golf ball within the image. Of course, the properties of the target object used in this technique will vary in accordance with the type of object which is being identified.

Alternatively, in other examples, the location of the object in the images received from the image capture device 1008a may be determined using a model trained on previous images of the object such as a machine learning or deep learning model, or neural network, for example.

Consider again the example of FIG. 2 of the present disclosure. Here, it is desired that the location of the golf ball is identified in each of the images received from the image capture device 1008a. Firstly, a set of training data must be obtained. This training data includes a large dataset of images of golf balls. These images may include a range of images of the golf ball in isolation and the golf ball at different locations across a golf course. The training data therefore provides the model to be trained with examples of the target (the golf ball in this example). In some examples, the training data may be artificially generated images of the golf ball. In other examples, the training data may be obtained from historical data (such as video data of previous sporting events).

The model (such as the neural network) is then configured to use the training examples in order to learn how to identify instances of the object in the images. Specifically, the neural network according to examples of the disclosure may be constructed of an input layer, an output layer and a number of 'hidden' layers therebetween. Each of these layers may include a number of distinct nodes. The nodes of the input layer are each connected to the nodes of the first hidden layer. The nodes of the first hidden layer are then connected to the nodes of the following hidden layer or, in the event that there are no further hidden layers, the output layer.

The nodes each take a number of inputs and produce an output based on those inputs. The inputs of each node have individual weights applied to them. The inputs (such as input images of the golf ball) are then processed by the hidden layers using weights which are adjusted during training. The output layer produces a prediction from the neural network (which varies depending on the input which was provided).

In examples, during training, adjustment of the weights of the nodes of the neural network is achieved through linear regression models. However, in other examples, non-linear methods may be implemented in order to adjust the weighting between nodes in order to train the neural network. Effectively, the training of the neural network is achieved by adjusting the weights of the nodes of the neural network in order to identify the weighting factors which, for the training input data provided, produce the best match to the actual location of the object in the training data (i.e. the images of the golf ball).

In other words, during training, both the inputs and target outputs of the neural network are provided. The network then processes the inputs and compares the resulting output against the target data (i.e. the location of the golf ball in the images). Differences between the output and the target data are then propagated back through the neural network, causing the neural network to adjust the weights of the respective nodes of the neural network.

Once trained, new input data can then be provided to the input layer of the neural network, which will cause the model to generate (on the basis of the weights applied to each of the nodes of the neural network during training) a predicted output for the given input data (being a prediction of the location of the golf ball in the image).

It will be appreciated that the specifics of the model, such as the number of layers or the numbers of nodes in each layer, will vary in accordance with the situation to which embodiments of the present disclosure are applied. Moreover, the number of training images used will vary depending on the requirements of the situation and the performance of the trained model during testing.

Furthermore, as described above, it will be appreciated that the mechanism used to identify the location of the object in the images is not particularly limited to the above examples. Rather, any such method may be used provided that the location of the object, once obtained, can be compared between the respective images which have been received.

In some examples, the device 1000A may be configured to identify the location of the object in the first image and the location of the object in the second image sequentially as the images are received. However, in other examples, the device 1000A may be configured to identify the location of the object in the images in parallel once the first and second images have been received.

<Motion Characteristics>

Once the location of the object in the first image and the object in the second image has been identified, the device 1000A is configured to determine one or more motion characteristics of the object.

Figure 3:
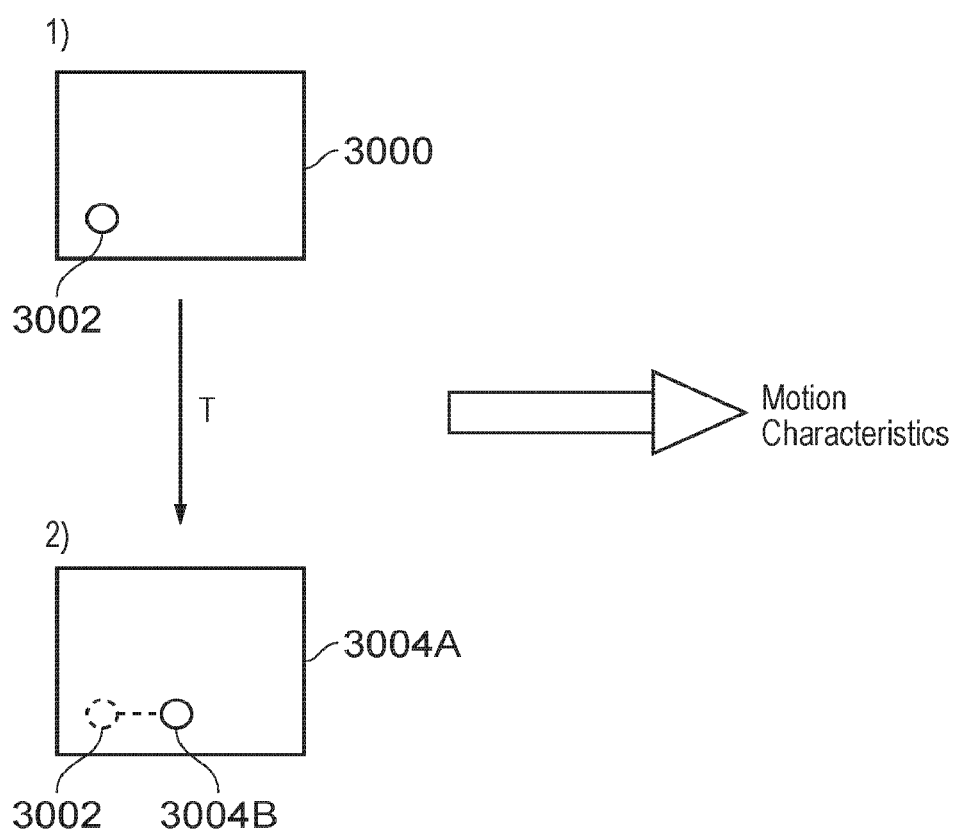
FIG. 3 illustrates an example set of images in accordance with embodiments of the disclosure.

Turning now to FIG. 3 of the present disclosure, an example set of images according to embodiments of the disclosure is shown. In this example, two images received from image capture device 2008a are shown.

In the first image 3000, an object 3002 (such as the golf ball 2004) is shown at a first location. The location of the object 3002 in the first image 3000 will have been identified by the device 1000A as previously described. Then, in the second image 3004A, the object 3002 has moved to a second location 3004B. That is, the object 3002 is no longer located at the first location in the second image 3004A (being the location at which the object 3002 was located in the first image 3000). Rather, the object 3002 is now located at the second location 3004B in the second image 3004A.

It will be appreciated that the movement of the object between the images is caused by the movement of the object itself; neither the surface on which the object is located nor the image capture device has moved between capture of the first and second images. The reason for the movement of the object will vary depending on the situation to which the embodiments of the disclosure are applied.

However, in the example described with reference to FIG. 2 of the present disclosure, the movement of the object between the images may be caused by person 2000 hitting the object (that is, the golf ball in this example); in these situations, no further momentum is imparted to the ball after the initial hit.

In some examples, the images received from the image capture device may include certain metadata indicative of the time of image capture of each image. In other examples, the frame rate of the image capture device may be known to device 1000A or reported thereto, such that device 1000A may determine the relative time of capture of the first image 3000 and the second image 3004A. Moreover, in other examples, the time of reception of each image from the image capture device may be recorded by the device 1000A. In any of these example situations, the device 1000A will know the relative time of the first image 3000 and second image 3004A and can thus determine the time T which has passed between the first image 3000 and the second image 3004A.

Accordingly, based on the information of the relative location of the object in the first and second image and the relative timing of the respective images, the device 1000A may identify one or more motion characteristics of the object (being certain properties indicative of the motion of the object).

For example, if the object 3002 has moved a distance D across the surface between the first and second image, the first and second image being separated by a time T, then the speed of the object can be determined as a motion characteristic of the object. In other words, the speed of the object may be identified as a motion characteristic of the object in embodiments of the disclosure.

Alternatively or in addition, the direction of motion of the object across the surface can be determined from a comparison of the first and second images. Here, in the example of FIG. 3 of the present disclosure, it can be determined by device 1000A that the ball moves horizontally between the first and second images. Accordingly, the direction of movement of the object may be identified as a motion characteristic of the object in embodiments of the disclosure.

Alternatively or in addition, the relative rotation of the object between the respective images can be determined by device 1000A. That is, once the object has been identified within the images, the orientation of the object in that image can be determined (in the event that the object has a feature, such as a marking or the like, which can be used in order to assign a relative orientation to the object in each of the images). If the orientation of the object varies between the first and second image the relative rotation (i.e. spin or angular rotation) of the object can be determined. Specifically, in the example of a golf ball, it will be appreciated that the golf ball may rotate as it rolls across the surface of the golf green such that its orientation changes between the first and second images. Accordingly, this rotation of the object may be identified as a motion characteristic of the object in embodiments of the disclosure.

In fact, it will be appreciated that the present disclosure is not particularly limited to these specific examples of the motion characteristics of the object. Rather, any kinematic property of the object which can be determined from the images received from the image capture device, and in particular from the relative location of the object in these images, may be used as a motion characteristic in accordance with embodiments of the disclosure.

In some examples, calibration of the image capture device 1008a may be required before the motion characteristics of the object can be determined by device 1000A. That is, for example, once the image capture device 1000A has been placed at a certain location on the golf course (to capture images of the green) calibration may be required in order that the motion characteristics of the object can be accurately determined from the image (i.e. such that real world distances can be determined from the images). In other examples, self calibration may be performed by the image capture device or device 1000A based on additional information (such as the physical real world dimensions of the surface (such as the golf green), for example). Further, in other examples, relative motion characteristics of the object, such as the relative direction of motion or relative spin of the object, may be determined from uncalibrated images of the object received from the image capture device.

<Predicted Path>

According to embodiments of the disclosure, the device 1000A is further configured to generate a predicted path of the object across the surface.

Consider again the example described with reference to FIG. 2 of the present disclosure. When a player hits the golf ball with a golf club, the golf ball will begin to move across the golf green. Certain characteristics of the motion of the golf ball after being hit can be determined from the first and second images of the golf ball received by device 1000A, provided that at least one of the first and second images are captured after the golf ball has been struck by the player. These motion characteristics can be used in order to generate a prediction of the location of the object at a future instance of time. When a predication of the location of the object is made for a series of future instances of time, a predicted path of the object across the surface can be generated by the device 1000A.

In particular, in this example, it will be appreciated that as the ball moves across the surface towards the golf hole it remains in contact with the surface (i.e. the golf green). Therefore, future motion of the golf ball 2004 across the surface will be dictated, at least in part, by the properties of the surface itself. That is, on a perfectly flat surface, the initial motion characteristics of the ball alone (being those motion characteristics determined from the comparison of the first and second image) may enable a reasonable prediction of the path of the ball across the surface to be determined. However, if the surface is not perfectly flat, such that it has certain individual geometric characteristic (such as slopes, undulations or the like) a prediction of the path of the ball across the surface based solely on the initial motion characteristics of the ball alone may not provide an accurate prediction of the path of the ball across the surface. Rather, the prediction of the path of the ball across the surface will be enhanced by a consideration of the individual characteristics of the surface itself.

In fact, even in the event of a perfectly flat surface, the path of an object, such as a ball, across the surface may be dictated at least in part by the characteristics of the surface on which the ball moves, such as the degree of friction imposed by the surface on the ball as the ball moves across the surface.

Therefore, in the present disclosure, the device 1000A is configured to generate a predicted path of the object across the surface based on a model of the surface and the motion characteristics of the object.

Figure 4A:
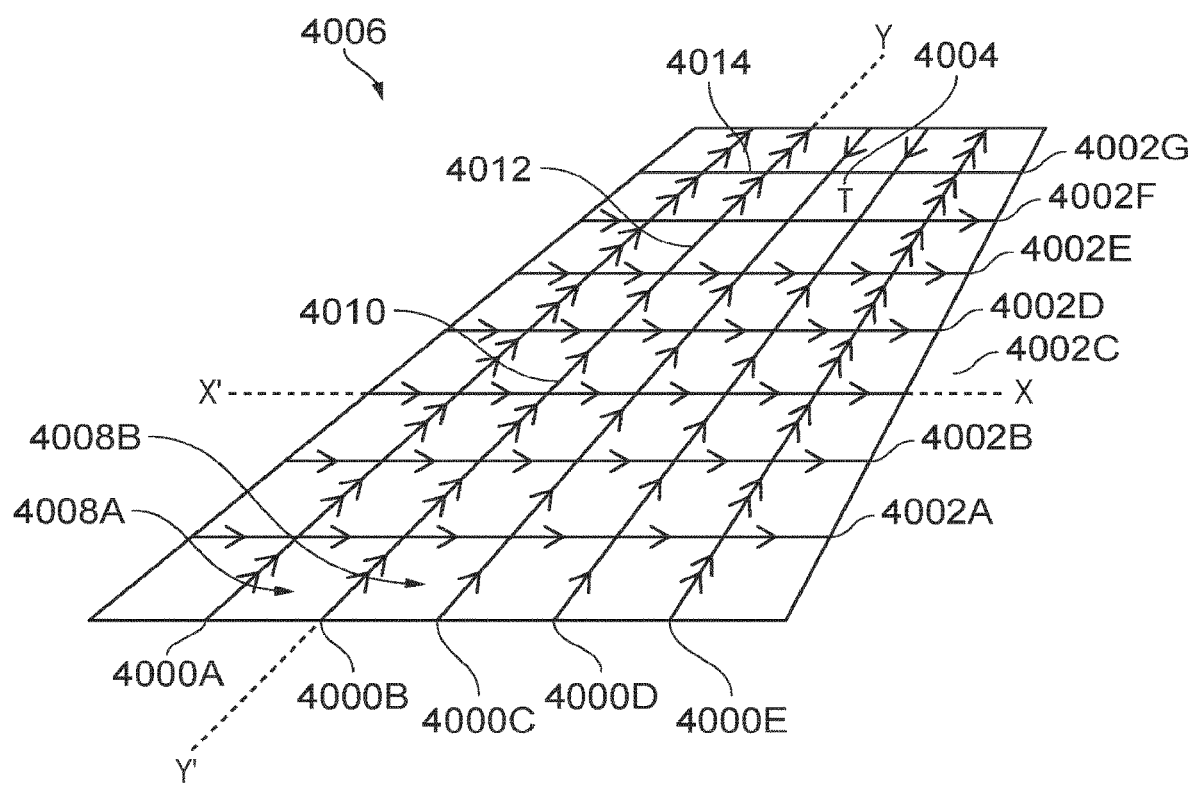
FIG. 4A illustrates an example surface in accordance with embodiments of the disclosure.

FIG. 4A illustrates an example surface in accordance with embodiments of the disclosure. The surface 4006 illustrated in FIG. 4A may be a surface such as a golf green (i.e. putting green) as described with reference to FIG. 2 of the present disclosure, for example.

In the example of FIG. 4A, the surface 4006 has been segmented into a number of individual cells defined by a series of rows 4002A to 4002G and columns 4000A to 4000E across the X-Y plane of the surface respectively. That is, the X-plane, in this example, extends across the surface in conjunction with the rows 4002A to 4002G, while the Y-plane extends across the surface in conjunction with the columns 4000A to 4000E. The Y-plane is orthogonal to the X-plane.

The direction of the Z-plane is orthogonal to the X-Y plane and is illustrated in FIG. 4A of the present disclosure.

An object, such as a ball, which travels across the surface, will change its location on the X-Y plane while remaining in contact with the surface 4006. The object itself remains in contact with the surface and no individual variations of the Z-coordinate of the object occur as it moves across the surface. That is, the Z-coordinate of the ball will not change independently of the Z-coordinate of the surface.

However, the surface 4006 itself is not positioned at a consistent coordinate in the Z-plane. That is, certain portions of the surface 4006 are located at different coordinates in the Z-plane with respect to other portions of the surface 4006. In FIG. 4A, this variation in the Z-coordinate is illustrated by a number of arrows on the lines which segment the individual cells of the surface. The direction of the arrow indicates the direction of change of Z-coordinate (with the arrows pointing towards a decrease in the Z-coordinate) when moving from a first cell to an adjacent cell, while the number of arrows indicate the magnitude of that change.

For example, moving across the Y-plane from cell 4008A to 4008B corresponds to a substantial decrease in the Z-coordinate (indicated by the two arrows) while moving across the X-plane from cell 4008A to 4008B corresponds to a more gradual decrease in the Z-coordinate (indicated by the single arrow).

In the following description, a movement resulting in a decrease in the Z-coordinate (i.e. from cell 4008A to 4008B) will be described as a movement downhill, while a movement resulting in an increase in the Z-coordinate (i.e. from cell 4008B to 4008A) will be described as a movement uphill.

Figure 4B:
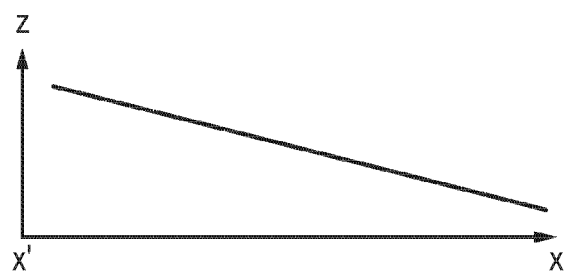
FIG. 4B illustrates an example surface in accordance with embodiments of the disclosure.

FIG. 4B of the present disclosure illustrates a profile of the surface 4006 across the line X'-X illustrated in FIG. 4A of the present disclosure. That is, the variation in Z-coordinate of the surface 4006 along the line X'-X is shown in FIG. 4B. Here, it can be seen that moving along the surface 4006 from X' to X along the line X'-X corresponds to a gradual decrease in the Z-coordinate (i.e. a gradual downhill slope). Conversely, moving from X-X' would correspond to a gradual uphill slope.

Figure 4C:
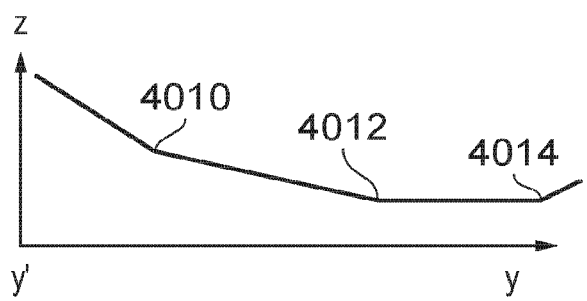
FIG. 4C illustrates an example surface in accordance with embodiments of the disclosure.

FIG. 4C of the present disclosure illustrates a profile of the surface across the line Y'-Y illustrated in FIG. 4A of the present disclosure. That is, the variation in the Z-coordinate of the surface 4006 along the line Y'-Y is shown in FIG. 4C. Here, it can be seen that when moving along the surface 4006 from Y'-Y, there is initially a rapid decrease in Z-coordinate (illustrated by the double arrows in FIG. 4A). Then, as the point 4010 is reached, the rate of decrease of Z-coordinate decreases (indicated by the single arrows in FIG. 4A). At point 4012 to 4014, there is no variation in Z-coordinate across surface 4006 on line Y'-Y (illustrated by the lack of arrows in FIG. 4A). Then, when point 4014 is reached, there begins an increase in the Z-coordinate (illustrated by the single arrows in FIG. 4A opposing the direction of arrows in region 4010 to 4012).

As such, the geographic variations of the example surface 4006 in the X-Y plane, X-Z plane and Y-Z plane can be understood from the description of FIGS. 4A, 4B and 4C.

Consider now an example where an object, such as a ball, is rolled across the surface 4006 towards a target T from cell 4008A. This may occur when a person (such as person 2000) hits a golf ball from cell 4008A to a golf hole represented by target T, for example.

On a flat surface (with no variation in Z-coordinate) the ball's path across the surface would be chiefly determined by its initial motion characteristics. However, on a surface such as surface 4006, the path of the ball across the surface will depend to a greater extent on the characteristics of the surface itself. That is, once set in motion, the ball will tend to increase in speed when heading downhill (corresponding to a decrease in the Z-coordinate). Therefore, if a person hits the ball directly towards the target T, without taking due account of the characteristics of the surface, the motion of the ball will be overcome by the forces caused by variations of the characteristics of the surface, and will thus be lead off line away from the intended target T. In particular, in the specific example of the surface 4006, the ball will, once set into motion, tend to veer downhill in the X'-X direction as it travels from cell 4008 towards the target. Accordingly, if the ball is hit directly towards the target T, the ball would then pass to the right hand side of the target T.

Rather, in order for the ball to be hit successfully such that it reaches target T from cell 4008, the ball will have to be hit in a direction such that as the ball veers downhill in the X'-X direction on its path, it does so to an extent that it arrives at the target T. In other words, due account of the characteristics of the surface must be take when hitting the ball towards the target.

Now, it will be appreciated that the surface 4006 may be represented by a model which accounts for the above described characteristics of the surface. This may, for example, be a mathematical model which describes the variations of the characteristics of the surface in each of the X-Y, X-Z and Y-Z planes. Alternatively, the model may be a virtual computational model of the surface. Alternatively, a topological model may be used in order to describe the characteristics and properties of the surface.

It will be appreciated that the example surface 4006 described with reference to FIGS. 4A, 4B and 4C of the present disclosure, is merely one example of a surface in accordance with embodiments of the disclosure. The present disclosure is not limited to this type of surface at all. Rather, the shape, geometric variations and characteristics of the surface in each of the three dimensions may be very different to that of the specific example surface 4006 illustrated in FIGS. 4A, 4B and 4C of the present disclosure.

Specifically, the model of the surface will vary depending on the actual surface on which the ball travels. Consider again the example described with reference to FIG. 2 of the present disclosure. In this example, the person 2000 hits the ball 2004 across the golf green 2002 (i.e. putting green) towards the hole 2006. In order to obtain a prediction of the path of the ball across the surface, it is required that a model of the individual surface 2002 is made available to the device 1000A.

In some examples, the model may be obtained by a series of initial images of the surface from a number of angles or locations. In other examples, the model of the surface may be constructed from observations obtained from laser scanning techniques or the like. Alternatively, a number of test objects may be displaced across the surface in order to analyse the motion of the objects and thus determine the underlying characteristics of the surface. Further alternatively, the model of an artificially created surface may be known or otherwise available from the person or persons who constructed that surface.

The model of the surface may be held in a storage device or database, or may be provided directly to the device 1000A, for example.

Now, while the model of the surface described above, with reference to FIGS. 4A, 4B and 4C of the present disclosure, has been described specifically with respect to the geometric characteristics of the surface, it will be appreciated that the present disclosure is not particularly limited in this regard. That is, the model of the surface may also include additional information such as information regarding the variation of the coefficient of friction across the surface, for example. The presence of this additional information in the model further enhances the ability of the device 1000A to generate an accurate prediction of the path of the object as it traverses across the surface.

Once the initial motion characteristics of the object have been determined by device 1000A (from the first and second images obtained from the image capture device 1008a) those initial motion characteristics of the object may be combined with the model of the surface in order to generate a prediction of the path of the object across the surface.

In some examples of the present disclosure, the predicted path of the object across the surface may be generated by use of a physical model accounting for the kinematic and/or dynamic properties of the ball as it moves across the surface based on the initial motion characteristics and the model of the surface. That is, a set of calculations or predictions of the path of the ball across the surface may be made based on the model of the surface with the initial motion characteristics of the ball being used as constraints which define the individual situation being experienced and observed.

In examples, as described above, this physical model may further include the consideration of additional forces including the forces of friction between the object and the surface and/or gravitational forces on the object. This more complex model, accounting for additional forces present on the object, may further enhance the accuracy of the prediction of the path of the object across the surface.

In other examples, generation of the predicted path of the object across the surface may further include use of a model trained on the paths of previous objects across the surface. That is, a machine learning or deep learning model, or neural network (such as those described above with reference to FIG. 2 of the present disclosure) may be used in order to generate a prediction of the path of the object across the surface. Here, the model may be trained on inputs such as the initial motion characteristics of the object and the location of the object on the surface and/or the model of the surface itself. That is, training data comprising this information may be propagated through the model (such as the neural network) as input data in conjunction with observations of the path of the object across the surface as output data. Then, when trained (i.e. when the weights of the neural network have been adjusted) the model may then be used to predict the path of other objects across the surface (with the initial motion characteristics of the object and the model of the surface being provided as input data to the model).

In fact, it will be appreciated that the present disclosure is not particularly limited to these examples of generating a prediction of the path of the ball across the surface. Rather, any such method which uses the initial motion characteristics of the object and the model of the surface as input may be used in order to generate the predicted path of the object in accordance with embodiments of the disclosure as required.

<Target Destination>

Once the predicted path of the object across the surface has been determined, the predicted path may then be used in order to assess and generate a prediction as to whether the object, as it travels across the surface, will reach the target destination. The prediction as to whether the object will reach the target destination is based on the predicted path and the location of the target destination.

The predicted path is the route across the surface that the object is expected to follow across a number of future image frames, with the predicted path being obtained based on the motion characteristics of the object in the initial video frames and the model of the surface across which the object moves. However, the form of the predicted path itself and the manner in which it is used with the target destination in order to produce the prediction may vary in accordance with the situation.

In some example situations, the predicted path may be a line or track across the surface which the object is expected to follow. In other example situations, the predicted path may be a series of coordinates indicative of the predicted position of the object in one or more future video frames. This provides both spatial and temporal information regarding the predicted path the object will follow. Further, in other examples, the predicted path may include a final location of the object (being the expected location of the object once that object has finished moving).

Figure 5A:
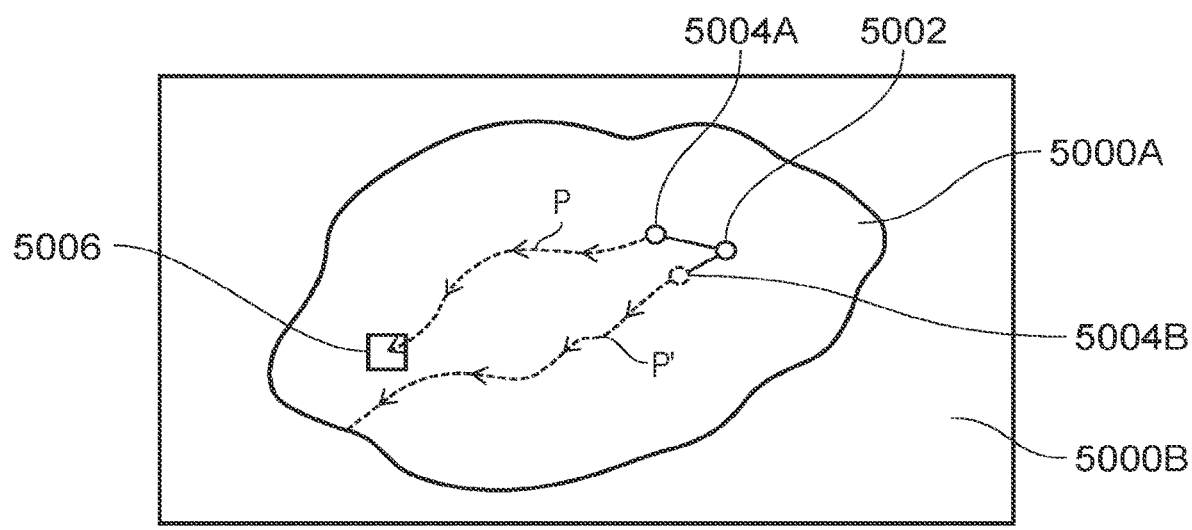
FIG. 5A illustrates an example predicted path of an object across a surface in accordance with embodiments of the disclosure.

FIG. 5A illustrates an example predicted path of an object across a surface in accordance with embodiments of the disclosure. In particular, this example may correspond to a sporting event such as that described with reference to FIG. 2 of the present disclosure.

Specifically, in this example, a surface 5000A is provided as part of a greater area 5000B. The surface 5000A may be a golf green forming part of a golf course 5000B for example. An object 5002 is located on the surface 5000A. The location of the object 5002 shown in FIG. 5 is the location of that object in a first frame which has been received by the device 1000A of the present disclosure. The object 5002 may be an object such as a golf ball, for example. A target destination 5006 is illustrated on the surface 5002; this may be a golf hole in/on the golf green into which a player is attempting to hit the golf ball.

Also illustrated in FIG. 5A is the position of the object 5002 in a second image which has been received by the device 1000A of the present disclosure. In a first example, the position of the object 5002 in the second image which has been received, 5004A, is shown in FIG. 5A.

As described in detail above with reference to FIG. 3 of the present disclosure, the device 1000A of the present disclosure is configured to obtain the initial motion characteristics of the object 5002 (e.g. after it has been struck by the player) from the respective location of the object in the first and second images which have been received. The model of the surface can then be used, as described with reference to FIG. 4A of the present disclosure, in order to obtain a predicted path P of the object in one or more future video frames as that object moves across the surface 5002.

In this first example, as is illustrated in FIG. 5A, the predicted path P of the path of the object across the surface leads the object across the surface in a manner which intercepts the target destination 5006. That is, at least a portion of the path P encounters the target 5006. Accordingly, since the path intercepts the target destination, it can be predicated that the object will reach the target destination. Therefore, in this example, even before the golf ball moves across the surface, a prediction can be made that the player has struck the golf ball in a manner that the golf ball will reach the golf hole.

In addition, in this golf example, a prediction may further be made as to whether or not the ball will fall into the hole. That is, when the predicted path of the ball does not intercept the location of the hole in/on the green it is clear that the ball will not fall into the hole. However, even when the predicted path intercepts the hole it may be that the ball will not fall into the hole. This may be because the speed of the ball when it intercepts the hole is too great, for example. Accordingly, in examples, analysis of the motion characteristics of the ball when it intercepts the hole may be made in order to predict whether or not the ball will fall into the hole.

A second example is also illustrated in FIG. 5A, where, in the second frame received by the device 1000A, the object 5002 is located at position 5004B (as opposed to position 5004A in the first example). The difference in the location of the object in the second frame (as compared to the first example) leads to a different set of motion characteristics being determined with respect to the object. Put another way, the second example corresponds to an example whereby the player has struck the ball differently to that of the first example.

It will be appreciated that while the motion characteristics of the ball vary between these first and second examples, the model of the surface 5002 remains unchanged (as in both examples, the object moves across the same surface). However, if the player was to play golf on a different golf green (e.g. on a different hole of the golf course) then the model of the surface would also vary accordingly.

In this second example, a second predicted path P' is obtained with respect to the motion of the object 5002 across the surface. The path P' differs from path P (from the first example) owing to the different initial motion characteristics of the object. As illustrated in FIG. 5A, it is clear that no part of path P' intersects the target destination 5006. Therefore, from analysis of the path P' with the target destination, a predication can be made that the object will not reach the target destination. Put another way, in the example of a golf ball being struck by a player, it can be understood that, based on the above prediction, the golf ball struck by the player will miss the hole in this example.

In the above example of FIG. 5A of the present disclosure, the predicted path forms a single track across the surface for each set of initial motion characteristics and model of the surface. Accordingly, a Boolean prediction as to whether the object will reach the target or not can be made based on the path of the object and the location of the target. However, the present disclosure is not particularly limited in this regard.

Figure 5B:
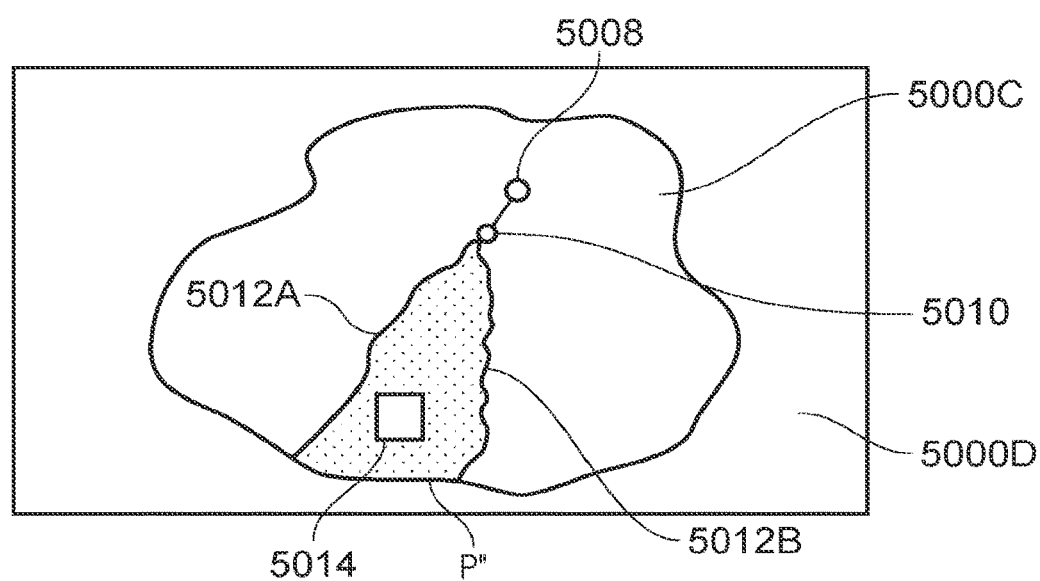
FIG. 5B illustrates an example predicted path of an object across a surface in accordance with embodiments of the disclosure.

Consider now, instead, FIG. 5B of the present disclosure. In this example, an object 5008 is located on a surface 5000C. The surface 5000C forms part of a larger area 5000D. A target destination 5014 is located on the surface 5000C.

The location of the object in a first image, 5008, received from an image capture device by the device 1000A of the present disclosure is illustrated in FIG. 5B. Furthermore, the location of the same object in a second image, 5010, received from the image capture device by the device 1000A of the present disclosure is also shown. The second image is an image captured at a time T after the first image. Accordingly, from the location of the object in these two images, initial motion characteristics of the object (having been struck by a player, for example) can be determined.

A predicted path P'' can be determined from the initial motion characteristics of the object and a model of the surface 5000C. As with the examples described with reference to FIG. 5A of the present disclosure, the predicted path provides a prediction of the location of the object in one or more subsequent images obtained by the image capture device. However, in this example the predicted path P''' forms a region or area encompassed by two extremes 5012A and 5012B. That is, the line 5012A indicates the furthest extent to the left hand side of the surface (as seen in FIG. 5B) that the object is predicted to travel in future frames based upon the initial motion characteristics and the model of the surface. In contrast, the line 5012B indicates the furthest extent to the right hand side of the surface (as seen in FIG. 5B) that the object is predicted to travel in future frames based upon the initial motion characteristics and the model of the surface. Together, these extremes form an envelope within which the object is predicted to travel based on the initial motion characteristics of the object and the model of the surface.

Variations in the prediction, leading to the difference between the extremes 5012A and 5012B, may occur for a number of reasons. In some examples, variation may arise owing to complexities or uncertainties of the underlying model of the surface. In other examples, variation may arise owing to uncertainties in the initial motion characteristics. In other examples, the extremes 5012A and 5012B may arise as bounds on a predicted path indicated by a trained model based upon previous instances of such an event (i.e. from the training data).

In any of these example situations, the predicted path P″ (including the extremes 5012A, 5012B and the area encompassed therebetween) can be used in order to assess whether or not the object will reach the target destination. Thus, the predicted path P″ may include a range of paths along which it is predicted the object may travel.

In fact, the predicted path P″ may be used, in this example, to place confidence intervals on the prediction as to whether the object will reach the target destination. In the example illustrated in FIG. 5B of the present disclosure, based on the path the device 1000A may determine that there is a 75% chance that the object will reach the target, a 10% chance that the object will pass to the left hand side of the target (when viewed as illustrated in FIG. 5B) and a 15% chance that the object will pass to the right hand side of the target (when viewed as illustrated in FIG. 5B). These confidence levels may then form the prediction as to whether or not the object will reach the target destination.

More generally, any suitable method of analysing the predicted path and/or comparing the predicted path with, or in in respect to, the target destination may be used in order to generate the predication. Hence, the apparatus may generate a prediction as to whether the object will reach the target destination based on the predicted path and the location of the target destination.

Moreover, in some examples, a prediction as to whether the object will reach the target destination may include a prediction of a future distance of the object from the target destination. This enables a user to understand how close the shot is predicted to be to the target, for example. The future distance may be determined at a number of points along the trajectory of the path (i.e. at a number of future moments in time) depending on the situation. For example, in some situations, it may be desired that the closest approach of the object to the target is determined. In this situation, the future distance is a minimum distance of the object from the target destination on the predicted path (i.e. the part of the predicted path which is the closest to the target destination). In other situations, the future distance of the object may be the predicted distance of the object from the target destination when the object stops moving (i.e. at the end of the predicted path of the object). This enables the user to understand the expected final distance of the object from the target destination (when the ball stops moving after a shot, for example).

Of course, there are other situations where the future distance of the object from the target destination may be predicted, and the present disclosure is not particularly limited to these examples.

Moreover, in some examples, a threshold level may be set a confidence level above which would indicate that it is likely the object will reach the target destination. That is, in the example of FIG. 5B, a predetermined threshold confidence level may be set at 70%. Therefore, since the predicted confidence of the object reaching the target is 75%, a Boolean indicator (or flag) that it is likely that the object will reach the target may be produced.

Hence, in examples, the prediction produced by device 1000A may be a prediction presenting a probability of the likelihood of the object reaching the target destination. This may further improve the accuracy and confidence of the prediction.

In some examples, the target destination may be a single location on the surface (such as the hole in/on the golf green). In other situations, the target destination may be a zone or region surrounding a location on the surface (such as all points within a predetermined radius of the golf hole, for example). In fact, the target destination may be a zone or region defining an area of the surface which has any desired shape. As such, it will be appreciated that the target destination may vary in its shape depending on the situation to which embodiments of the disclosure are applied. Therefore, more generally, the target destination may be a region of the surface.

In fact, in some examples, a number of target destinations may be present on a surface. Here, the prediction may be made individually with respect to each of the target destinations as required.

Of course, it will be appreciated that the present disclosure is not particularly limited to the examples of the comparison between the predicted path and the target illustrated in FIGS. 5A and 5B of the present disclosure. The predicted paths will depend on the actual situation to which the embodiments of the disclosure are applied and may vary considerably from the type of paths illustrated with reference to FIGS. 5A and 5B of the present disclosure.

<Advantageous Technical Effects>

According to embodiments of the disclosure, a prediction can be made as to whether an object moving across a surface will reach a target destination. As such, both accurate and efficient predictions can be made regarding the outcome of an event (such as a sporting event). In particular, the combined use of the model of the surface and the initial motion characteristics of the object, in the manner described in the present disclosure, enables a realistic prediction as to whether the object will reach the target destination to be made substantially in real time during the event.

Of course, the present disclosure is not particularly limited to these technical effects. Other technical effects are provided by the embodiments of the present disclosure as are apparent to the skilled person when reading the present disclosure.

<Additional Modifications>

As described above with reference to FIGS. 2 to 5 of the present disclosure, it will be appreciated that a prediction is made as to whether or not an object travelling across a surface will reach a target destination based upon the initial motion characteristics of the object (with the initial motion characteristics of the object being determined based on the location of the object in the first and second images received by the device 1000A). Accordingly, in certain examples, the prediction is made once with respect to the object; this may be at a time when the object begins to move (i.e. when it has been hit or struck by a person). However, the present disclosure is not particularly limited in this regard. That is, in embodiments, the prediction as to whether or not the object will reach the target destination may be both made and updated a number of times as and when further images of the object are received. Updating the generated prediction a number of times in this manner, when further images of the object are received, may further improve the accuracy of the prediction over time (as the object progresses along its path across the surface). In fact, this may be particularly advantageous in situations where an external factor (e.g. an imperfection on the surface (such as a divot on the green)) causes the object to deviate from its originally predicted path. When the prediction is updated based on the additional images, the prediction can be adapted in order to account for these variations.

Consider, again, the example situation of FIG. 5B of the present disclosure. Initially, in this example, the predicted path P'" is formed based upon the initial motion characteristics of the object and the model of the surface. That is, the initial motion characteristics are determined based on the location of the object in the first image 5008 and the location of the object in the second image 5010. In other words, the predicted path P'" is formed in substantially real time based on the motion of the object between the first and second images.

However, as time progresses, the object will, by virtue of the momentum imparted to it by the initial strike from the player, continue its journey across the surface (until resultant frictional forces dissipate all the momentum of the object). In certain examples, one or more further images of the object may be captured by the image capture device and provided to the device 1000A in real time (these images being captured later in time than the first and second images of the object previously discussed). Therefore, in these further images, the location of the ball on the surface at a time T2 after the second image may be revealed. The location of the ball on the surface in these further images may then be used in order to update the prediction as to whether the ball will reach the target destination.

That is, in some examples, the additional location of the ball (as revealed by the further images) may be used in order to further refine the value of the motion characteristics of the object which have been determined. By using the additional spatial and temporal information of the object (obtained from the further images) a more refined value of the motion characteristics of the object may be determined. These more refined values of the motion characteristics of the object may then be used in order to update the prediction as to whether or not the object will reach the target.

Further, in some examples, the additional location of the object (as revealed by the further images) may also be used in order to directly update the predicted path P'" itself. For example, initially (based solely on the first and second images) it may be determined that the object has a 15% chance of passing to a left hand side of the target region and a 10% chance of passing to the right hand side of the target region (with a 75% chance of passing through the target region). However, based on the location of the object in further images, it may become apparent that the object has begun to drift closer to one or other side of the surface as it travels. Accordingly, from the location of the object in the further images, it may subsequently be determined that the object has 20% chance of passing to the left hand side of the target region and only a 5% chance of passing to the right hand side of the target region (with a 75% chance of passing through the target region itself). The envelope of the predicted path P'" will therefore narrow as the object moves across the surface, and the predicted path P'" is updated with the additional information of the actual location of the object in the further images.

Therefore, more generally, it will be appreciated that examples of the present disclosure may include the additional step of receiving one or more further images and updating the predicted path of the object as the object moves across the surface.

In the above described embodiments of the disclosure, the device 1000A is configured in order to generate a prediction as to whether an object moving across a surface reaches a target destination. This is advantageous because it enables greater understanding of the potential outcome of an event, even before the event itself has been completed.

However, in some examples, it may be desired that a more detailed and/or visual indication of the prediction is provided. Consider, for example, a situation whereby a broadcaster who is broadcasting video content (such as a live stream of a sporting event (such as the golf event described with reference to FIG. 2 of the present disclosure)) wants to provide to the entities digesting the video content additional information regarding the sporting event as it occurs. Here, when a player hits a golf ball on the green, the broadcaster may receive from device 1000A a real time prediction as to whether or not the ball will fall into the hole. Accordingly, the broadcaster (or indeed device 1000A) may augment the video content received from the image capture device (i.e. the first and/or second image and each subsequent image) with a visual indication as to whether or not the golf ball is predicted to fall into the hole.

In certain examples this visual indication as to whether or not the golf ball is predicted to fall into the hole (or, more generally, an object will reach the target destination) may be provided once the ball has been set into motion by the player and then updated as one or more further images of the ball travelling across the golf green are received. This may be in the form of a good/bad shot marker, for example. That is, when the prediction shows that the golf ball will reach the target destination, a visual indicator (such as text stating: "Good Shot" or "Shot on Target") could be overlaid on top of the video content received from the image capture device. In contrast, this visual indicator may be replaced by a visual indicator (such as text stating: "Poor Shot" or "Shot off Target") when it is determined that the ball is not predicted to reach the target destination. Of course, the visual indicator used to indicate a good/bad shot is not particularly limited to this example and may vary in accordance with the situation to which the embodiments of the disclosure are applied.

In fact, in some examples, the predicted path of the golf ball itself (such as P'" illustrated in FIG. 5B of the present disclosure) may be overlaid on top of the video content received from the image capture device. This may further enhance the viewer's understanding of, and sense of immersion in, the sporting event. Furthermore, the predicted path may be updated as the ball moves across the surface in order to update the additional information being provided to the viewer.

Furthermore, while the above described embodiments of the disclosure have been described with reference to the example situation of FIG. 2 of the present disclosure (which relates to an example where a player is playing golf on a surface), it will be appreciated that the present disclosure is not so limited in this respect. That is, while certain features of the present disclosure have been described with reference to this example of the game or sport of golf, it will be appreciated that embodiments of the present disclosure may also be applied, more generally, to any such sporting event whereby an object is to travel across a surface. In particular, embodiments of the disclosure may be applied also to other sports such as bowls, curling, snooker, or the like. Embodiments of the disclosure may also be applied to certain parts of other sporting events, such as football (or soccer), where an object moves, at least in part, over a surface (e.g. when dribbling the football or when passing the football along the ground, for example).

In fact embodiments of the present disclosure may also be applied more generally to events outside the realm of sporting events where it is also desirable that a prediction be made as to whether an object moving across a surface reaches a target destination. This may include any situation where an object moves or slides across a surface, and thus could be applied to the sliding of objects across an ice-sheet, for example.

<Method>

Figure 6:
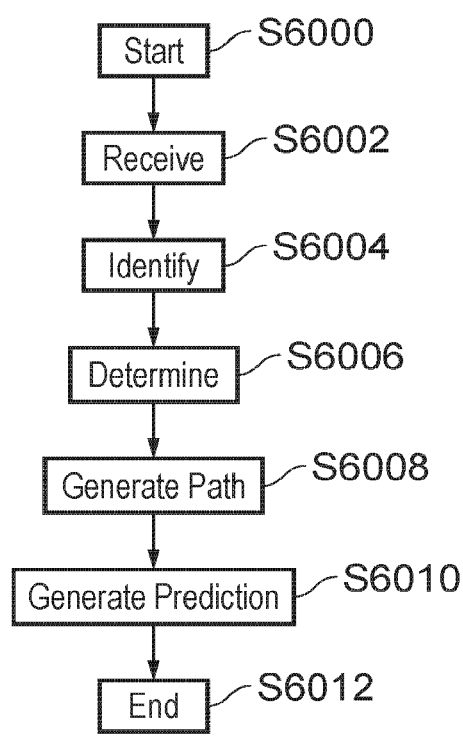
FIG. 6 illustrates a method in accordance with embodiments of the disclosure.

Hence, more generally, a method of predicting whether an object moving across a surface will reach a target destination is provided. FIG. 6 illustrates a method according to embodiments of the disclosure.

The method starts at step S6000, and proceeds to step S6002.

In step S6002, the method comprises receiving a first image and one or more subsequent second images from a camera.

Once the first and second images have been received, the method proceeds to step S6004.

In step S6004, the method comprises identifying a location of an object on a surface in the first image and identifying a location of the object on the surface in one or more of the second images.

Once the location of the object in the images has been identified, the method proceeds to step S6006.

In step S6006, the method comprises determining one or more motion characteristics of the object based on the location of the object in the first image and the location of the object in the one or more second images.

The method then proceeds to step S6008.

In step S6008, the method comprises generating a predicted path of the object across the surface based on a model of the surface and the motion characteristics of the object.

Once the predicted path has been generated, the method proceeds to step S6010.

In step S6010, the method comprises generating a prediction of whether the object will reach the target destination based on the predicted path of the object and the location of the target destination.

The method then proceeds to, and ends with, step S6012.

<Clauses>

Furthermore, embodiments of the present disclosure may be arranged in accordance with the following numbered Clauses:

1. An apparatus for predicting whether an object moving across a surface will reach a target destination, the apparatus comprising circuitry configured to:

receive a first image and one or more subsequent second images from a camera;

identify a location of an object on a surface in the first image;

identify a location of the object on the surface in one or more of the second images;

determine one or more motion characteristics of the object based on the location of the object in the first image and the location of the object in the one or more second images;

generate a predicted path of the object across the surface based on a model of the surface and the motion characteristics of the object; and generate a prediction of whether the object will reach the target destination based on the predicted path of the object and the location of the target destination.

2. The apparatus according to Clause 1, wherein the prediction is a likelihood of the object reaching the target destination.

3. The apparatus according to Clause 1, wherein the prediction is a Boolean indication as to whether the object will reach the target destination.

4. The apparatus according to Clause 1, wherein the predication includes a prediction of a future distance of the object from the target destination.

5. The apparatus according to Clause 4, wherein the future distance of the object from the target destination is a minimum distance of the object from the target destination on the predicted path or a final distance of the object from the target destination.

6. The apparatus according to any preceding Clause, wherein the apparatus is further configured to predict that the object will reach the target destination when the predicted path of the ball intercepts the target destination.

7. The apparatus according to any preceding Clause, wherein the model of the surface includes a model of the topology of the surface.

8. The apparatus according to any preceding Clause, wherein the motion characteristics of the object include at least one of a speed of the object across the surface, a direction of travel of the object across the surface, and/or an angular rotation of the object.

9. The apparatus according to any preceding Clause, wherein the apparatus is further configured to receive one or more further images and updating the predicted path of the object as the object moves across the surface.

10. The apparatus according to any preceding Clause, wherein the apparatus is configured to receive the images from the camera in real time as the object moves across the surface.

11. The apparatus according to any preceding Clause, wherein the object is a ball and the target destination is a hole in the surface, and the apparatus is further configured to predict whether the object will fall into the hole.

12. The apparatus according to any preceding Clause, wherein the apparatus is configured to receive the images from a single camera.

13. The apparatus according to any preceding Clause, wherein the apparatus is further configured to generate the predicted path using a physical model accounting for additional forces on the object.

14. The apparatus according to Clause 13, wherein the additional forces include friction between the object and the surface and/or gravitational forces on the object.

15. The apparatus according to any preceding Clause, wherein the apparatus is further configured to overlay at least one of the first image and/or one or more of the second images with a visual indication of the predicted path of the object.

16. The apparatus according to any preceding Clause, wherein the apparatus is further configured to generate the predicted path further includes using a model trained on the paths of previous objects across the surface.

17. The apparatus according to Clause 16, where the model is a machine learning model or deep learning model.

18. The apparatus according to any preceding Clause, wherein the apparatus is further configured to identify the location of the object in the image by object recognition.

19. The apparatus according to any of Clauses 1 to 16, wherein the apparatus is further configured to identify the location of the object in the image using a model trained on previous images of the object.

20. The apparatus according to Clause 19, wherein the model is a machine learning model or deep learning model.

21. The apparatus according to any preceding Clause, wherein the predicted path includes a range of paths which may be taken by the object across the surface.

22. The apparatus according to Clause 21, wherein the apparatus is further configured to predict the likelihood of the object reaching the target destination and/or a level of uncertainty in the prediction based on the range of paths.

23. The apparatus according to any preceding Clause, wherein the target destination is a predetermined region of the surface.

24. A method of predicting whether an object moving across a surface will reach a target destination, the method comprising:
receiving a first image and one or more subsequent second images from a camera;
identifying a location of an object on a surface in the first image;
identifying a location of the object on the surface in one or more of the second images;
determining one or more motion characteristics of the object based on the location of the object in the first image and the location of the object in the one or more second images;
generating a predicted path of the object across the surface based on a model of the surface and the motion characteristics of the object; and
generating a prediction of whether the object will reach the target destination based on the predicted path of the object and the location of the target destination.

25. A computer program product comprising instructions which, when the program is executed by a computer, cause the computer to carry out a method of predicting whether an object moving across a surface will reach a target destination, the method comprising:
receiving a first image and one or more subsequent second images from a camera;
identifying a location of an object on a surface in the first image;
identifying a location of the object on the surface in one or more of the second images;
determining one or more motion characteristics of the object based on the location of the object in the first image and the location of the object in the one or more second images;
generating a predicted path of the object across the surface based on a model of the surface and the motion characteristics of the object; and
generating a prediction of whether the object will reach the target destination based on the predicted path of the object and the location of the target destination.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. An apparatus for predicting whether an object moving across a surface will reach a target destination, the apparatus comprising
circuitry configured to:
receive a first image and one or more subsequent second images from a camera;
identify a location of an object on a surface in the first image;
identify a location of the object on the surface in one or more of the second images;
determine one or more motion characteristics of the object based on the location of the object in the first image and the location of the object in the one or more second images;
generate a predicted path of the object across the surface based on a model of the surface and the motion characteristics of the object; and
generate a prediction of whether the object will reach the target destination based on the predicted path of the object and the location of the target destination,
wherein the prediction is a likelihood of the object reaching the target destination, and
wherein the predicted path of the object across the surface is further based on a path model representing paths of objects across the surface.

2. The apparatus according to claim 1, wherein the prediction is a Boolean indication as to whether the object will reach the target destination.

3. The apparatus according to claim 1, wherein the predication includes a prediction of a future distance of the object from the target destination.

4. The apparatus according to claim 3, wherein the future distance of the object from the target destination is a minimum distance of the object from the target destination on the predicted path or a final distance of the object from the target destination.

5. The apparatus according to claim 1, wherein the apparatus is further configured to predict that the object will reach the target destination when the predicted path of the object intercepts the target destination.

6. The apparatus according to claim 1, wherein the model of the surface includes a model of a topology of the surface.

7. The apparatus according to claim 1, wherein the motion characteristics of the object include at least one of a speed of the object across the surface, a direction of travel of the object across the surface, and/or an angular rotation of the object.

8. The apparatus according to claim 1, wherein the apparatus is further configured to receive one or more further images and updating the predicted path of the object as the object moves across the surface.

9. The apparatus according to claim 1, wherein the apparatus is configured to receive the images from the camera in real time as the object moves across the surface.

10. The apparatus according to claim 1, wherein the object is a ball and the target destination is a hole in the surface, and the apparatus is further configured to predict whether the object will fall into the hole.

11. The apparatus according to claim 1, wherein the apparatus is configured to receive the images from a single camera.

12. The apparatus according to claim 1, wherein the apparatus is further configured to generate the predicted path using a physical model accounting for additional forces on the object.

13. The apparatus according to claim 12, wherein the additional forces include friction between the object and the surface and/or gravitational forces on the object.

14. The apparatus according to claim 1, wherein the apparatus is further configured to overlay at least one of the first image and/or one or more of the second images with a visual indication of the predicted path of the object.

15. The apparatus according to claim 1, wherein the apparatus is further configured to generate the predicted path using the path model trained on the paths of previous objects across the surface.

16. The apparatus according to claim 15, where the model is a machine learning model or deep learning model.

17. The apparatus according to claim 16, wherein the apparatus is further configured to identify the location of the object in the image by object recognition.

18. The apparatus according to claim 1, wherein the apparatus is further configured to identify the location of the object in the image using a model trained on previous images of the object.

19. The apparatus according to claim 1, wherein the predicted path includes a range of paths which may be taken by the object across the surface.

20. A non-transitory computer readable medium comprising instructions which, when executed by a computer, cause the computer to carry out a method of predicting whether an object moving across a surface will reach a target destination, the method comprising:
   receiving a first image and one or more subsequent second images from a camera;
   identifying a location of an object on a surface in the first image;
   identifying a location of the object on the surface in one or more of the second images;
   determining one or more motion characteristics of the object based on the location of the object in the first image and the location of the object in the one or more second images;
   generating a predicted path of the object across the surface based on a model of the surface and the motion characteristics of the object; and
   generating a prediction of whether the object will reach the target destination based on the predicted path of the object and the location of the target destination, and
   wherein the predicted path of the object across the surface is further based on a path model representing paths of objects across the surface.

* * * * *